United States Patent [19]
Takai et al.

[11] 3,775,657
[45] Nov. 27, 1973

[54] METHOD AND DEVICE FOR DRIVING STEP-BY-STEP ELECTRICAL ROTARY MACHINE

[75] Inventors: Hiroyaki Takai, Kawasaki; Kensuke Hasegawa, Yokohama; Michio Nakano, Tokyo, all of Japan

[73] Assignee: President of Tokyo Institute of Technology, Tokyo, Japan

[22] Filed: Mar. 10, 1972

[21] Appl. No.: 233,619

[30] Foreign Application Priority Data
Mar. 18, 1971 Japan.................................. 46/15879

[52] U.S. Cl.................. 318/696, 318/685, 318/187, 318/188
[51] Int. Cl. ........................................... G05b 19/40
[58] Field of Search.................... 318/608, 237, 187, 318/188, 133, 696, 685

[56] References Cited
UNITED STATES PATENTS
3,359,499  12/1967  McDonough et al. .......... 318/608 X
2,896,143  7/1959  Bekey ............................. 318/187 X
2,168,170  8/1939  Mittag............................. 318/187 X
2,537,427  1/1951  Seid et al. ............................. 318/608
2,824,272  2/1958  Delaporte ....................... 318/187 X
3,374,359  3/1968  Anderson............................ 310/608
3,421,061  1/1969  Baughman ...................... 318/187 X Primary Examiner—G. R. Simmons
Attorney—Milton J. Wayne et al.

[57] ABSTRACT

An electrical rotary machine comprising a stator and a rotor may be used as a step motor when the outputs of a digital phase modulator comprising a clock pulse generator and pulse number reducing circuits each comprising a chain of flip-flops connected in series are applied to the stator and the rotor windings through an inverter respectively to generate the rotating magnetic fields. In response to a number of rotation command pulses to be inserted in a clock pulse train from the clock pulse generator and to a manner by which the command pulses are inserted into the clock pulse train, a number of steps and the direction of rotation of the rotor can be controlled. The angle of rotation of the rotor in response to one command pulse may be varied by varying a number of series-connected flip-flops in the pulse number reducing circuit.

6 Claims, 7 Drawing Figures

PATENTED NOV 27 1973

METHOD AND DEVICE FOR DRIVING STEP-BY-STEP ELECTRICAL ROTARY MACHINE

BACKGROUND OF THE INVENTION

The present invention relates to a method and a device for driving step-by-step an electrical rotary machine and more particularly an electrical rotary machine comprising a stator and rotor both carrying polyphase windings.

In general, the prior art stepping motors have a construction comprising a salient pole rotor having a plurality of teeth and a stator having a plurality of teeth corresponding to the salient poles of the rotor formed around the inner periphery and the excitation windings. When the currents flow through the excitation windings, the rotor is attracted and when the direction of the currents is reversed, the direction of rotation of the rotor is reversed. However, DC currents in large magnitude generally flow through the windings, so that the heating problem imposes the limitation upon the capacity of the prior art stepping motors. Furthermore, there is another objecton in that a circuit for switching the DC currents is large in size and complicated in construction. The angle of rotation of the rotor in response to one input pulse is determined solely depending upon the mechanical constructions of the rotor and the stator, and a circuit which is extremely complicated in construction has been required to vary the angle of rotation of the rotor in response to one input pulse. Therefore, the variation and control of the angle of rotation of the rotor in response to one input pulse has have been virtually difficult to obtain in the prior art stepping motors.

SUMMARY OF THE INVENTION

One of the objects of the present invention is to provide a method and a device for permitting a general electrical rotary machine to be used as a stepping motor.

Another object of the present invention is to provide a stepping motor which is simple in construction but capable of producing a high output.

Another object of the present invention is to provide a method and a device capable of changing arbitrarily an angle of rotation of the rotor by simple means in response to one input pulse.

A further object of the present invention is to provide a system and a device which is simple in construction and operation for driving step-by-step an electrical rotary machine.

According to the present invention, an electrical rotary machine comprising a stator and a rotor each having the identical polyphase windings may be used as a stepping motor. The phase of the AC voltage applied to one of the stator and the rotor is shifted with respect to the reference phase of the AC voltage applied to the other in proportion to a number of command pulses so that the angle of rotation of the rotor is proportional to the number of command pulses.

According to one aspect of the present invention, the stator or rotor is supplied with the AC voltage from a power source circuit comprising a clock pulse generator, a plurality of flip-flops or pulse number reducing means and an inverter connected in series. On the other hand, the rotor or stator is supplied with the AC voltage from a power source circuit comprising the clock pulse generator, a gate circuit, a plurality of flip-flops or pulse number reducing means and an inverter connected in series. These power source circuits are called the digital phase modulators. The AC voltages appear at the outputs of the inverters in response to the outputs of the series-connected flip-flop circuits to which are applied the output of the clock pulse generator. The outputs of the flip-flop circuits are applied to the windings on the stator and rotor through each of the inverters. The rotor is locked in a position corresponding to the difference in phase of the AC voltages applied to the stator and rotor. When a number of pulses are applied to the power source circuit including the gate, the output AC voltage of this circuit is advanced or lagged in phase with respect to the AC voltage supplied from the power source circuit without a gate. Therefore, the rotor is caused to rotate step-by-step through an angle corresponding to the phase difference between the two AC voltages. That is, a number of steps made by the rotor is controlled in response to a number of pulses applied to the gate, and the angle of rotation of the rotor in response to one command pulse can be varied by changing the number of series-connected flip-flops.

One of the novel advantages of the present invention resides in the fact that a conventional electrical rotary machine comprising a stator and a rotor both carrying the polyphase windings may be used as a stepping motor. Therefore, the stepping motor in accordance with the present invention is extremely simplified in construction as compared with the prior art stepping motors. Furthermore, when the rotor is locked in position, no current flows except the current for exciting the magnetic circuits as in the case of a transformer, so that the undesired heating problem can be eliminated and the power consumption may be lowered. In the prior art stepping motors, the angle of rotation of the rotor in response to an input signal is dependent solely upon their mechanical construction. However, according to the present invention, the angle of rotation of the rotor in response to one command pulse may be electrically varied by a control unit.

The above and other objects, features and advantages of the present invention will become more apparent from the following description of the preferred embodiments thereof taken in conjunction with the accompanying drawing.

DESCRIPTION OF THE PREFERRED EMBODIMENT

First the principle of the present invention will be described. It is assumed that the present invention be applied to a two-phase induction motor which, as diagrammatically shown in FIG.1, comprises a stator 1 carrying (a reference and control) windings 1M and 1A and a wound rotor 4 carrying windings 4M and 4A. Because of series-connected capacitors 2 and 5, these windings 1A and 4A are supplied with the voltages 90° out of phase with the voltages supplied to the windings 1M and 4M from voltage sources 3 and 6 respectively.

Figure 1:
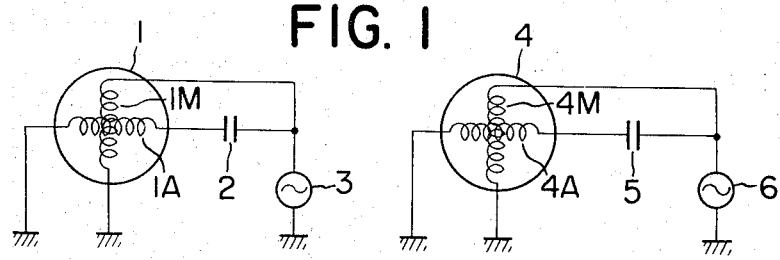
FIG. 1 is a diagrammatic view illustrating a two-phase induction motor to which is applied the present invention.
Figure 4:
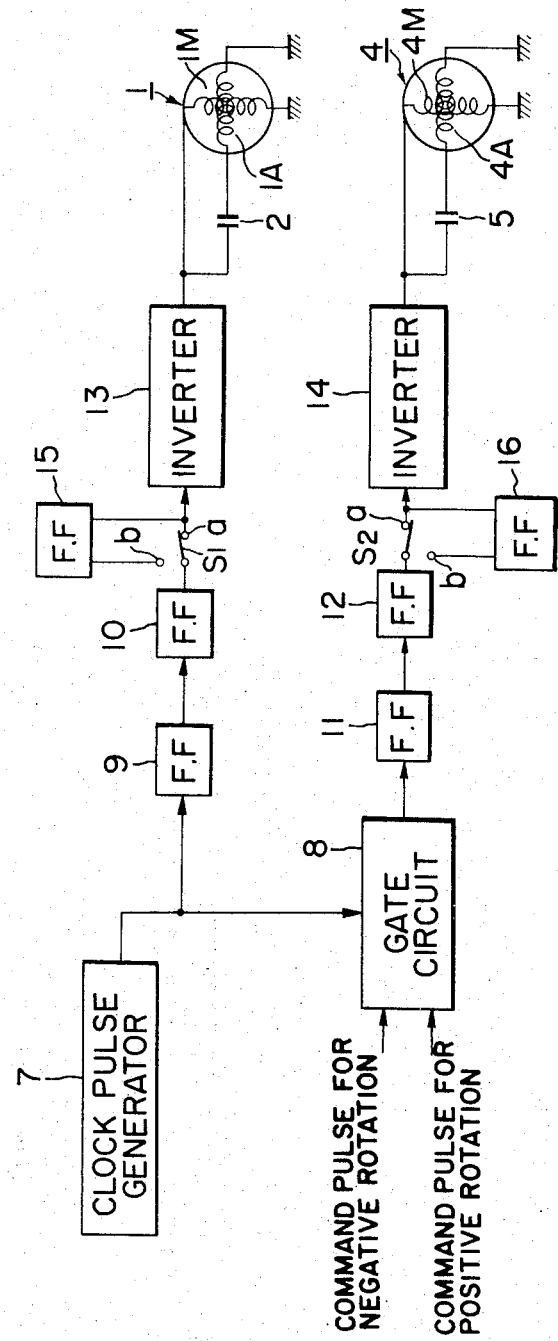
FIG. 4 is a block diagram of a control unit in accordance with the present invention.

Referring to FIG.4, a control unit of the present invention, which is for permitting the two-phase induction motor of the type shown in FIG.1 to be used as a step motor, comprises a clock pulse generator 7, a gate circuit 8, a first chain of flip-flops 9, 10 and 15 and an inverter 13, which is the source 3 shown in FIG.1, a second chain of flip-flops 11, 12 and 16, and an inverter 14 which is the source 6 shown in FIG.1 for supplying the voltage to the rotor 4. These inverters 13 and 14 are adapted to supply the AC voltages to the stator 1 and to the rotor 4, respectively, in synchronism with the outputs from the flip-flops 10 or 15 and 12 or 16, respectively. The flip-flops 15 and 16 may be selectively inserted between the flip-flop 10 and the inverter 13 and between the flip-flop 12 and the inverter 14, respectively by switches $S_1$ and $S_2$ as will be described in more detail hereinafter. Although the first and second chains of flip-flops are shown as consisting of three flip-flops, the number of flip-flops in each chain may be increased or decreased so that the angle of rotation of the rotor 4 in response to one command pulse may be arbitrarily selected in a manner to be described hereinafter.

Figure 2:
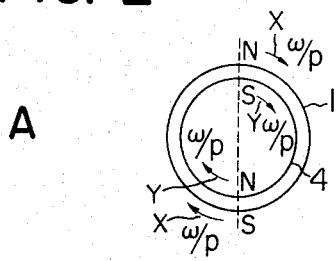
FIGS. 2 and 3 are views used for explanation of the principle of the present invention, FIG. 2 showing the case when the output torque is zero whereas FIG. 3 showing the case when the torque in the clockwise direction is produced.
Figure 2:
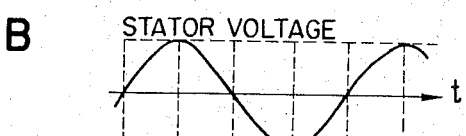
Figure 2:
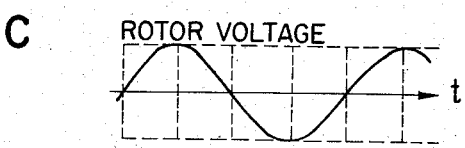
Figure 3:
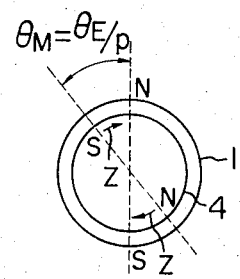
Figure 3:
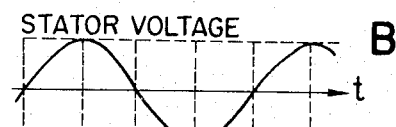
Figure 3:
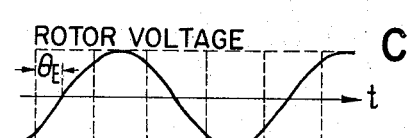

Next referring to FIGS.2 and 3, when the stator and rotor voltages are in phase as shown at B and C in FIG.2, and if the initial mechanical angle $\theta_M$ between the stator and rotor windings is zero, and rotating magnetic fields rotate in the same direction as indicated by the arrows X and Y at the same angular velocity and in the same phase, the poles N and S of the stator 1 are in opposition to the poles S and N of the rotor 4. Consequently the rotor 4 is not rotated and remains in a locked position.

When the voltage supplied from the source 6 lags by an electrical angle $\theta_E$ behind the voltage supplied from the source 3 to the stator winding as shown in FIG.3, the rotating magnetic field which is set by the rotor winding lags by $\theta_E$ behind the rotating magnetic field generated by the stator winding, so that the torque is produced to turn the rotor 4 in the clockwise direction in order to eliminate this phase difference $\theta_E$ between the two rotating magnetic fields as shown in FIG.3. As a result, the rotor 4 rotates in the direction indicated by Z through an angle given by $$\theta_M = \theta_E/P$$

where $p$ = the number of pairs of poles which equals $P/2$ where $P$ is the number of poles.

Figure 5:
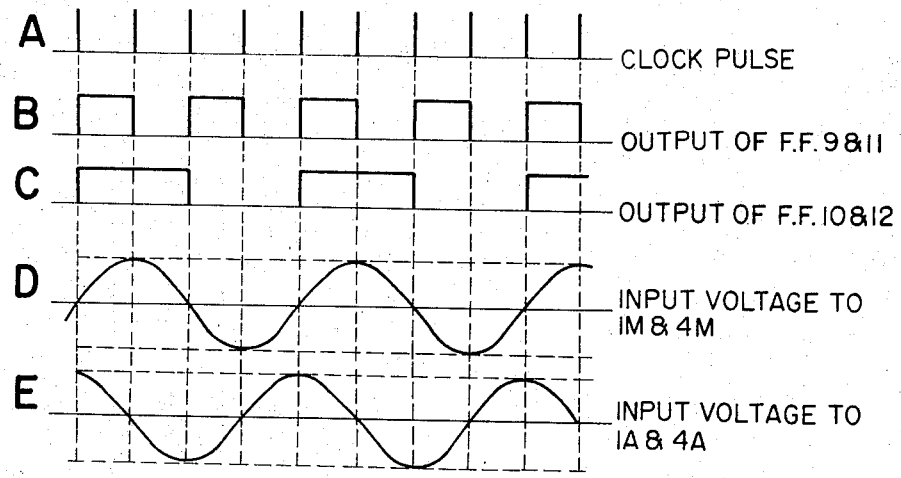
FIGS. 5-7 are views illustrating various waveforms at various points in the control unit shown in FIG. 4 for explanation of the mode of operation thereof.

From the foregoing description of the principle of the present invention, it is now clear that the two-phase induction motor can be used as a step motor, and next the mode of operation of this step motor will be described in more detail with reference to FIGS.4 and 5. For the sake of explanation, it is assumed that the initial mechanical angle between the stator and rotor windings is zero as shown in FIG.2A, and that the AC voltages in phase be initially supplied to the stator and rotor windings. As described hereinbefore, the AC voltages are supplied from the inverters 13 and 14 in response to the outputs from the flip-flops 10 and 12 respectively. The waveforms of the voltages at various points in the control unit are shown in FIG.5. That is, the outputs as shown at A and B in FIG.5 are derived from the flip-flops 9 and 11 and from 10 and 12, respectively, in response to the clock pulse train from the clock pulse generator 7. It should be noted that, as is well known in the art, the pulse duration of the outputs from the flip-flops 10 and 11 is twice that of the outputs from the flip-flops 9 and 11 and that the pulse duration is further doubled when another flip-flop is added in series. Thus, the windings 1M and 4M of the stator and the rotor are supplied with the voltage shown at D in FIG.5, whereas the windings 1A and 4A, the voltages shown at E in FIG.5.

Figure 6:
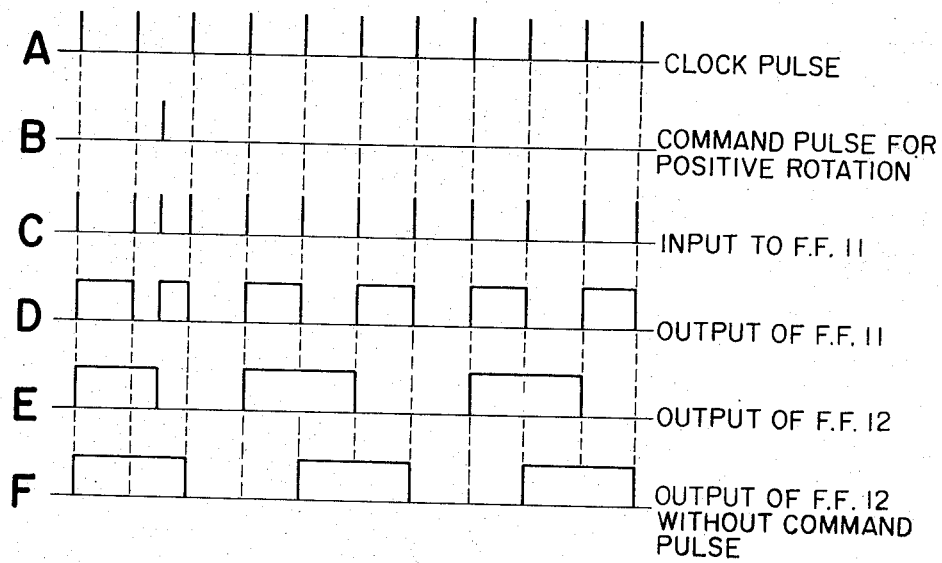
Figure 7:
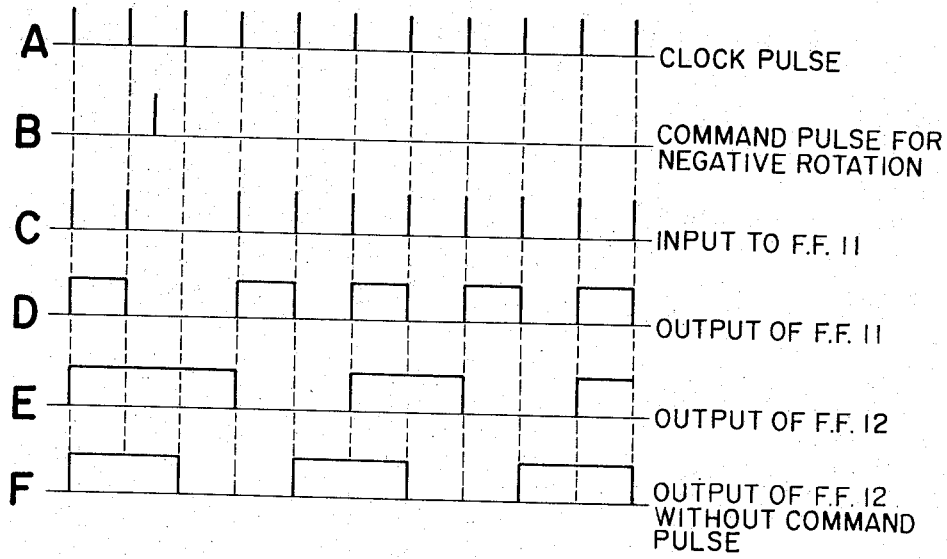

When a positive rotation command pulse is applied to the gate 8, it is added into the clock pulse train supplied to the flip-flop 11 as shown at C in FIG.6 so that the phase of the voltage supplied to the rotor 4 leads by an angle corresponding to one pulse relative to the phase of the voltage supplied to the stator 1. As a result, the rotor 4 is caused to rotate stepwise to eliminate this phase difference in the manner described above, and is stopped and locked in position when this phase difference has been eliminated. On the other hand when a negative rotation command pulse is applied to the gate 8, one pulse is cancelled from the clock pulse train supplied from the clock pulse generator 7 to the flip-flop 11 as shown at B and C in FIG.7. As a result, the phase of the voltage applied to the rotor 4 lags behind that of the voltage supplied to the stator 1 by an angle corresponding to one pulse, so that the rotor 4 is caused to rotate in the counterclockwise direction through $\theta_M$ which is equal to $\theta_E/p$ and is locked in position in the manner similar to that described above.

From the foregoing description, it is seen that the gate 8 serves as an adder circuit when the positive rotation command pulse is applied and as a subtraction circuit when the negative rotation command pulse is applied, so that the digital control of the angle of rotation of the rotor in response to the positive or negative command signals applied to the gate 8 becomes possible. That is, in response to the positive or negative command pulse applied to the gate 8, the phase of the voltage applied to the rotor 4 leads or lags by an angle corresponding to one command pulse relative to the phase of the voltage applied to the stator 1. The phase difference $\theta_E$ caused by one command pulse is given by $$\theta_E = 2\pi \cdot 1/2^n \text{ (radians)}$$

where $n$ = the number of flip-flops connected in series, and a positive integer. It is therefore seen that the angle of rotation of the rotor in response to one command pulse may be varied over a wide range when a number of flip-flops connected in series is selected as desired.

Next the function of the flip-flops 15 and 16 which are normally disconnected from the chains of flip-flops in the control circuit as shown in FIG.4 will be described. When the moving contacts of the switches $S_1$ and $S_2$ are switched from the fixed contacts $a$ to the fixed contacts $b$, these flip-flops 15 and 16 are connected in series with the flip-flops 9 and 10 and 11 and 12 respectively. This means, the number of the series connected flip-flops in each voltage supply circuit is increased by one so that the angle of rotation of the rotor is decreased by one half. It is seen that as one additional flip-flop is added, the angle of rotation is further reduced by one half from the above equation.

What is claimed is:

1. A method for driving step-by-step an electrical rotary machine comprising the steps of applying polyphase AC voltages generated in synchronism with the pulses in a clock pulse train to the polyphase windings on a stator and a rotor of an electrical rotary machine so as to generate the rotating magnetic fields, inserting a number of rotation command pulses into said clock pulse train to be applied to one of said stator and rotor so as to vary the phase of the voltage applied to said one of said stator and rotor with respect to the phase of the voltage applied to the other, and varying the phase of the rotating magnetic field on said one of said stator and rotor step-by-step, thereby causing said rotor to rotate step-by-step.

2. A method for driving step-by-step an electrical rotary machine set forth in claim 1 comprising controlling the number of steps made by said rotor in response to a number of said rotation command pulses.

3. A method for driving step-by-step an electrical rotary machine set forth in claim 1 comprising generating said polyphase AC voltages by a circuit connected in series to a circuit comprising a predetermined number of circuits for reducing pulses so that the angle of rotation of said rotor in response to each of said rotation command pulses may be controlled by the number of said pulse number reducing circuits.

4. A device for driving step-by-step an electrical rotary machine having a stator and rotor with polyphase windings, comprising a clock pulse generator means, a first AC voltage generator circuit comprising a first series-connected circuit connected in series to the output of said clock pulse generator means and comprising a predetermined number of pulse number reducing means, and an AC voltage generator means connected in series to the output of said first series-connected circuit;

a second AC voltage generator circuit comprising a rotation command-pulse-control gate connected in series to the output of said clock pulse generator means, a second series-connected circuit connected in series to the output of said gate and comprising a predetermined number of pulse counting means, and an AC voltage generator means connected in series to the output of said second series-connected circuit, means applying the outputs of said first and second AC voltage generator circuits to the polyphase windings of said stator and a rotor of said electrical rotary machine respectively so that the rotating magnetic fields may be produced by said polyphase windings of said stator and said rotor respectively; whereby the angle and direction of rotation of said rotor are controlled in response to a number of said rotation-command-pulses and to a manner by which said rotation-command-pulses are applied.

5. A device for driving step-by-step an electrical rotary machine set forth in claim 4 wherein said first and second AC voltage generator circuits further comprise means for changing the number of said pulse counting means.

6. A device for driving step-by-step an electrical rotary machine set forth in claim 4 wherein said pulse number reducing means comprise flip-flops.

* * * * *